United States Patent
Quintana Arregui et al.

(10) Patent No.: US 10,800,202 B2
(45) Date of Patent: Oct. 13, 2020

(54) METHOD AND DEVICE FOR DOCUMENT SECURITY BY GENERATING MULTIPLE REFLECTIVE AND TRANSMISSIVE LATENT IMAGES

(71) Applicants: UNIVERSIDAD POLITECNICA DE MADRID, Madrid (ES); ALISE DEVICES, S.L., Madrid (ES)

(72) Inventors: Patxi Xabier Quintana Arregui, Madrid (ES); Morten Andreas Geday, Madrid (ES); José Manuel Otón Sánchez, Madrid (ES); Beatriz Cerrolaza Martinez, Madrid (ES); Carlos Carrasco Vela, Madrid (ES)

(73) Assignees: UNIVERSIDAD POLITECNICA DE MADRID, Madrid (ES); ALISE DEVICES, S.L., Madrid (ES)

( * ) Notice: Subject to any disclaimer, the term of this patent is extended or adjusted under 35 U.S.C. 154(b) by 0 days.

(21) Appl. No.: 15/743,480

(22) PCT Filed: Jul. 10, 2015

(86) PCT No.: PCT/ES2015/070540
§ 371 (c)(1),
(2) Date: Jan. 10, 2018

(87) PCT Pub. No.: WO2017/009494
PCT Pub. Date: Jan. 19, 2017

(65) Prior Publication Data
US 2018/0201045 A1     Jul. 19, 2018

(51) Int. Cl.
*B42D 25/364*      (2014.01)
*B42D 25/328*      (2014.01)
(Continued)

(52) U.S. Cl.
CPC ............. *B42D 25/364* (2014.10); *B41M 3/14* (2013.01); *B41M 3/148* (2013.01); *B42D 25/30* (2014.10);
(Continued)

(58) Field of Classification Search
CPC . B42D 25/328; B42D 25/364; B42D 2033/26
See application file for complete search history.

(56) References Cited

U.S. PATENT DOCUMENTS

| | | | |
|---|---|---|---|
| 6,734,936 B1 * | 5/2004 | Schadt | B42D 25/364 349/117 |
| 2003/0133098 A1 * | 7/2003 | Hoshino | B42D 25/364 40/448 |

(Continued)

FOREIGN PATENT DOCUMENTS

| | | |
|---|---|---|
| EP | 1452338 A1 | 9/2004 |
| EP | 2543521 B1 | 9/2015 |

(Continued)

OTHER PUBLICATIONS

International Search Report & Written Opinion dated Feb. 25, 2016 from PCT Application No. PCT/ES2015/070540.

*Primary Examiner* — Kyle R Grabowski
(74) *Attorney, Agent, or Firm* — Innovation Capital Law Group, LLP; Vic Lin (57) ABSTRACT

The present invention relates to a production method and to a device for document security applications including various latent images on each side. The invention comprises: depositing, according to an established pattern, at least one layer of metallized material, forming a holographic element on at least one part of one of the surfaces of a confinement substrate; defining different regions on the surface of the substrate; inducing different alignment directions for orienting a liquid crystal according to the previously defined regions; doping the liquid crystal with at least one dichroic (Continued)

dye; placing the liquid crystal over at least one confinement substrate, covering the holographic element; adding a second confinement substrate, forming a sandwich-type structure; and polymerizing the liquid crystal, forming a sheet.

10 Claims, 10 Drawing Sheets

(51) Int. Cl.
| | |
|---|---|
| *B41M 3/14* | (2006.01) |
| *G02F 1/13* | (2006.01) |
| *G02B 5/30* | (2006.01) |
| *G02F 1/00* | (2006.01) |
| *G07D 7/121* | (2016.01) |
| *G07D 7/128* | (2016.01) |
| *B42D 25/351* | (2014.01) |
| *B42D 25/373* | (2014.01) |
| *B42D 25/324* | (2014.01) |
| *B42D 25/391* | (2014.01) |
| *B42D 25/405* | (2014.01) |
| *B42D 25/30* | (2014.01) |
| *B42D 25/23* | (2014.01) |
| *B42D 25/29* | (2014.01) |
| *G03H 1/04* | (2006.01) |

(52) U.S. Cl.
CPC ......... *B42D 25/324* (2014.10); *B42D 25/328* (2014.10); *B42D 25/351* (2014.10); *B42D 25/373* (2014.10); *B42D 25/391* (2014.10); *B42D 25/405* (2014.10); *G02B 5/30* (2013.01); *G02B 5/3016* (2013.01); *G02F 1/00* (2013.01); *G02F 1/13* (2013.01); *G07D 7/121* (2013.01); *G07D 7/128* (2013.01); *B42D 25/23* (2014.10); *B42D 25/29* (2014.10); *G03H 1/0402* (2013.01); *G03H 2001/0439* (2013.01)

(56) References Cited

U.S. PATENT DOCUMENTS

| | | | |
|---|---|---|---|
| 2007/0053028 | A1 | 3/2007 | Ezra |
| 2012/0007351 | A1* | 1/2012 | Suzuki ................. B42D 25/364 283/85 |
| 2012/0300156 | A1* | 11/2012 | Quintana Arregui ....................... B41M 3/148 349/85 |
| 2013/0341903 | A1* | 12/2013 | Ochiai ................. B42D 25/364 283/85 |
| 2014/0232974 | A1* | 8/2014 | Tomkins .............. B42D 25/328 349/127 |
| 2015/0360500 | A1 | 12/2015 | Lok |
| 2016/0075164 | A1 | 3/2016 | Sarrazin |
| 2016/0240112 | A1* | 8/2016 | Liu ........................ B42D 25/00 |

FOREIGN PATENT DOCUMENTS

| | | |
|---|---|---|
| ES | 2337010 A1 | 4/2010 |
| WO | 1998052077 A1 | 11/1998 |
| WO | 2006005149 A2 | 1/2006 |
| WO | 2008110316 A1 | 9/2008 |
| WO | 2008131852 A1 | 11/2008 |
| WO | 2015028618 A1 | 3/2015 |

* cited by examiner

METHOD AND DEVICE FOR DOCUMENT SECURITY BY GENERATING MULTIPLE REFLECTIVE AND TRANSMISSIVE LATENT IMAGES

TECHNICAL FIELD OF THE INVENTION

The present invention is applicable to the field of document security and more specifically relates to the security features provided by optical devices, which make the verification of original documents easier, for example, by means of incorporating a sheet with multiple reflective and transmissive latent images.

BACKGROUND OF THE INVENTION

Methods and devices for security purposes existing in banknotes, ID cards or other similar documents often use directly visible holograms as a verification element.

On the other hand, the growing trend of including transparent windows in documents of a certain type, such as new national ID cards or Euro banknotes, has led to the development of new and more visually appealing security measures based on transmissive holographic elements.

For example, patent document ES2337010 discloses transmissive sheets, which when illuminated with polarized light, show one or more images on each side, while maintaining their transparency at the same time. In contrast, no image is observed when they are illuminated with natural light. The images can be B/W, monochrome or multicolor images and they can be provided with grayscale and/or high resolution. Nevertheless, their application for achieving document security is not immediate for many of the existing solutions, since they entail certain requirements in terms of flexibility, definition and simplicity of production/use that not all of them comply with.

Patent document WO 98/52077 discloses devices based on photo-oriented polymer networks (PPNs) arranged on a substrate and selectively oriented in directions which vary in different regions of the surface. In turn, the PPN layer is covered with another layer formed by cross-linked liquid crystal monomers. This second layer is optically anisotropic and birefringent, acting as an optical retarder. The liquid crystal of the retarder layer spontaneously follows the selective orientation dictated by the PPN. This allows to obtain phase delayed images that can be seen with the help of a polarizer. As can be seen in the drawings, the structure thereof is indeed a complex one where three layers are needed, two of them being linear retarder layers created from liquid crystal polymers (LCPs), and the third layer being a linear polarizer.

The state of the art offers several solutions combining directly visible features and covert features that can be viewed, for example in patent document WO 2008/131852-A1; this document, however, requires the use of a laser, so it does not relate to direct viewing devices. Other solutions consider exhibiting different images on each side when they are illuminated with polarized light. However the embodiment and operating principle of these devices are complex and they require at least two retarder sheets with linear retarding patterns and a central polarizing film, such as in the above-mentioned patent document WO 98/52077 or EP 2543521A1.

Therefore new contributions to the state of the art improving current solutions for document security by generating multiple reflective and transmissive latent images in a new simple, flexible and effective direct viewing feature that does not require the use of a laser, would be desirable.

DESCRIPTION OF THE INVENTION

The present invention solves the aforementioned problems by presenting a new feature for document security based on the observation of holographic images under reflection on one or both sides of the document, and the observation of one or more images under transmission on each side depending on the viewing mode. By making use of the properties of iridescent and non-iridescent variable optical devices, such as anisotropy, optical birefringence, or the phase transition of the liquid crystal material itself, optical effects that can be readily verified with the naked eye or by means of using simple optical elements are achieved. Each device can offer at least one latent image on each side that is only visible when it is observed in transmissive mode under polarized light. Additionally it shall include a reflective holographic image on at least one side of the film, although it can also be included on both sides.

To that end, the present invention proposes a method for producing features for document security purpose including several latent images. The method comprises the steps of:
  a) depositing, according to at least one established pattern, at least one layer of at least partially metallized material, forming a holographic element on at least one part of one of the sides of at least one confinement substrate;
  b) defining different regions on the surface of at least one substrate;
  c) inducing different alignment directions for orienting a liquid crystal material according to the previously defined regions;
  d) doping the liquid crystal with at least one dichroic dye;
  e) placing the doped liquid crystal on at least one confinement substrate, covering the holographic element;
  f) adding a second confinement substrate, forming a sandwich-type structure;
  g) polymerizing the liquid crystal, forming a sheet.

According to one of the embodiments of the invention, the different regions in the substrate are defined depending on the holographic element deposited on at least one part of the substrate's surface. Therefore, the holographic elements can advantageously be used for aligning the liquid crystal and the dichroic dye, allowing the creation of latent images on the LCP layer between the holographic surfaces, which will determine the alignment pattern of the liquid crystal. More specifically, in one of the embodiments of the invention, the micrometric or submicrometric grooves of the holographic motifs can advantageously be used as alignment surfaces for dye-doped liquid crystals.

One of the embodiments of the present invention contemplates removing at least one of the confinement substrates once the liquid crystal has been polymerized.

One of the embodiments of the present invention contemplates removing both confinement substrates once the liquid crystal has been polymerized.

The techniques used for defining different regions on the inner surface of the confinement substrate may comprise at least one of the following techniques:
  photolithography;
  masks;
  physical barriers;
  selective deposition;
  thermal evaporation;
  inkjet;
  micrometric or submicrometric pattern generation;

partial (semireflective) metallization which reflects part of the incident light and transmits the rest;

selective reflective or semireflective metallization which covers a specific area of the device;

or a combination thereof.

According to one of the embodiments of the present invention, the different alignment directions can be generated in any direction parallel to the plane of the confinement substrates, wherein the alignment directions induced on one of the faces of a substrate are independent of those induced in a second substrate and comprise the use of at least one of the following techniques:

mechanical rubbing of the alignment layer;

photoalignment of a photosensitive material;

oblique deposition of an aligner material;

alignment by means of micrometric or submicrometric pattern;

generation of a pattern of interdigitated electrodes on the surface of the confinement plates oriented in different directions.

or a combination thereof.

It is contemplated that the alignments induced in at least two regions are not linear with respect to one another. One of the particular embodiments of the invention further contemplates that at least two of the induced alignments are orthogonal with respect to one another.

Determining the relative angle existing between the induced alignment directions to generate different gray levels in the latent image is contemplated in one of the embodiments of the present invention.

Adding an RGB color matrix to generate latent images is contemplated in one of the embodiments of the present invention. Additionally, the color matrix can be arranged such that the regions defined in the sheet are made to coincide with the pixelation of the matrix on either the outer face of the already polymerized liquid crystal sheet or on the inner face of a protective polymer layer located on the sheet.

According to one of the embodiments of the present invention, different dichroic dyes can optionally be added in specific regions of the devices to generate regions of different colors.

A second aspect of the present invention relates to a device for document security including various latent images, where said device comprises:

at least one holographic element comprising one or more layers of at least partially metallized material, deposited on at least one of the faces of a confinement substrate, forming reflective holographic images when illuminated (the reflective holographic image covers at least partially the surface of one side. In the event that it covers the entire surface of said side, it is only partially metallized, such that a fraction of the incident light is reflected, allowing the remaining fraction of the light to be transmitted in transmissive mode);

a liquid crystal sheet, covering at least one holographic element, doped with at least one dichroic dye oriented according to the alignment directions induced in different predefined regions of the inner surfaces of two confinement substrates. The orientation of the different regions is established according to at least one alignment pattern and they differ from one another by an angle smaller than or equal to 90° on at least one of the faces forming latent images which are visible when illuminated with polarized light.

Alternatively, the metallized holographic elements can be located in specific areas of the surface. In this case it can be partially or completely metallized, with other regions remaining unmetallized.

It is contemplated that the light used for showing the images in transmissive mode is linearly polarized, although images may become visible with a lower contrast using partially polarized light or light with circular or elliptical polarization.

The alignment pattern can be established according to the holographic element deposited on at least one part of the surface of the substrate.

Additionally, the present invention may comprise, according to one of its embodiments, a protective sheet on both sides of the assembly formed by the liquid crystal sheet and the holographic elements to preserve the device.

One of the embodiments of the present invention contemplates different dichroic dyes distributed throughout the different regions defined in the liquid crystal sheet, generating different colors.

An RGB color matrix located between the liquid crystal sheet and the protective sheet is optionally contemplated in one of the embodiments of the present invention.

The alignment directions can exhibit relative orientations of 0°, 45°, 90° and 135° according to different embodiments of the invention to generate two non-overlapping monochrome images that are visible in transmission on each side of the sheet.

The alignment directions can exhibit any relative orientation comprised between 0° and 90° according to different embodiments of the invention to generate grayscale images visible in transmission on each side of the sheet.

According to one of the embodiments, the device of the present invention may comprise one or more removable and reusable confinement plates that have been previously treated to generate an alignment pattern with different regions and orientations in the liquid crystal sheet.

Therefore, the characteristics of the present invention in relation to security features for document security applications made from dichroic dye-doped liquid crystal polymers (LCPs) or reactive mesogens (RMs), involve various advantageous technical effects over the state of the art, such as, for example, the use of substrates with holographic elements that can be selectively metallized in sectors, partially metallized or not metallized, such that the patterns can be used to align the dichroic dye-doped LCP. Once the LCP has been polymerized, this method allows creating reflective and transmissive security elements integrated in a single device. When the holographic elements are partially metallized, the patterns shown by reflection on one side coincide with the patterns visible in transmission on the opposite side.

The present invention also advantageously uses non-metallized holographic elements to align dichroic dye-doped LCP layers. When the transmissive layer is polymerized and removed from the substrates, the partial or selective metallization allows creating reflective and transmissive elements in the same device. These security features can show reflective patterns on one side, if the holographic elements are indeed partially metallized, and the same pattern in transmission on the opposite side.

Another alternative is the use of partially or selectively metallized holographic elements for aligning dichroic dye-doped LCP layers. Once the LCP has been polymerized, it is removed from the substrates along with the metallization layer (which was previously located in the holographic element) adhered thereto. The method allows creating reflective and transmissive security elements integrated in a single device. These security elements show reflective patterns on one side, if the holographic elements are indeed partially metallized, and the same pattern in transmission on the opposite side.

A final aspect of the present invention relates to the use of partially or selectively metallized holographic elements that adhere to dichroic dye-doped LCP sheets, in which other different latent images had been previously induced on each side. The method allows creating reflective and transmissive security features integrated in a single device. The holographic patterns observed in reflection are completely independent and different from the transmissive images.

Furthermore, the present invention is perfectly suited to the windows that are currently being used in certain documents such as national ID cards or banknotes. This invention constitutes an advanced and effective security feature which, unlike the complex structures of the solutions of the state of the art in which several retarder layers plus an additional polarizer layer are required, comprises a single-layer film, in which the liquid crystal adopts variable angles in a circular twist retarder configuration, whose purpose is to align the dichroic dye such that it can selectively absorb the incident polarized light according to its orientation.

DESCRIPTION OF THE DRAWINGS

To complement the description that is being made and for the purpose of aiding to better understand the features of the invention, a set of drawings is attached as an integral part of said description in which the following has been depicted in an illustrative and non-limiting manner.

DETAILED DESCRIPTION OF THE INVENTION

According to one of the embodiments, the device of the present invention is based on one transparent and colored thin sheet of liquid crystal polymer (LCP) or reactive mesogen (RM) doped with at least one dichroic dye, though it could be doped with more dichroic dyes. On the sides of the sheet there are holographic elements that are partially metallized or metallized in selected areas. Alternatively, these holographic elements can be completely metallized in part of the device, so part of the device is opaque (reflective) while another part is transparent or partially transparent.

The transparent sheet does not exhibit any image in transmission when it is illuminated with unpolarized light, but when the device is illuminated with polarized light (such as, for example, the outcoming light from a mobile phone LCD or OLED, computer or television display), and observed in transmission, it shows at least one image on each side (depending on the incidence angle of the light in the entrance surface and the position of the dye molecules with respect to the impinging polarized light), the images that are visible when illuminating one side or the other are completely different. The images provided can be B/W or grayscale, monochrome or full-color images. To visualize latent images in transmission in the transparent device, instead of a polarized light source, a linear polarizer can be placed in front of or behind the sheet.

The images that are visible in transmission can be completely independent of those that are visible in reflection, or in the simplest embodiment, each image that is seen in transmission corresponds with the image that is observed in reflection on the opposite side of the film.

This security device therefore comprises, in a single element, level 1 features (holographic security features) and level 1.5 features (transmissive features which require an additional element for its verification, but which is of common use). These transmissive features can be considered as level 1 when observed with partially polarized light coming from a reflection on any dielectric surface.

The devices according to one of the embodiments of the invention are created using two flexible substrates provided with a partially or selectively metallized holographic pattern. These substrates act as confinement plates and alignment surfaces. The dichroic dye-doped liquid crystal layer is therefore located between the substrates, although alternatively, a dichroic dye-doped LCP layer can be deposited on each substrate, attaching them together face to face at a later stage. The holographic pattern induces different alignments in selective areas, generating the desired motifs on both sides of the liquid crystal layer. These motifs become visible in transmission by illuminating them with polarized light. The motifs generated by the holograms themselves are visible in reflection by illuminating them with natural light.

FIGS. 1 to 13 show a variety of possible embodiments according to the present invention.

FIGS. 1 to 5 show examples in which the polymerizable dye-doped liquid crystal layer is confined between holographic surfaces forming part of the final device.

Figure 6:
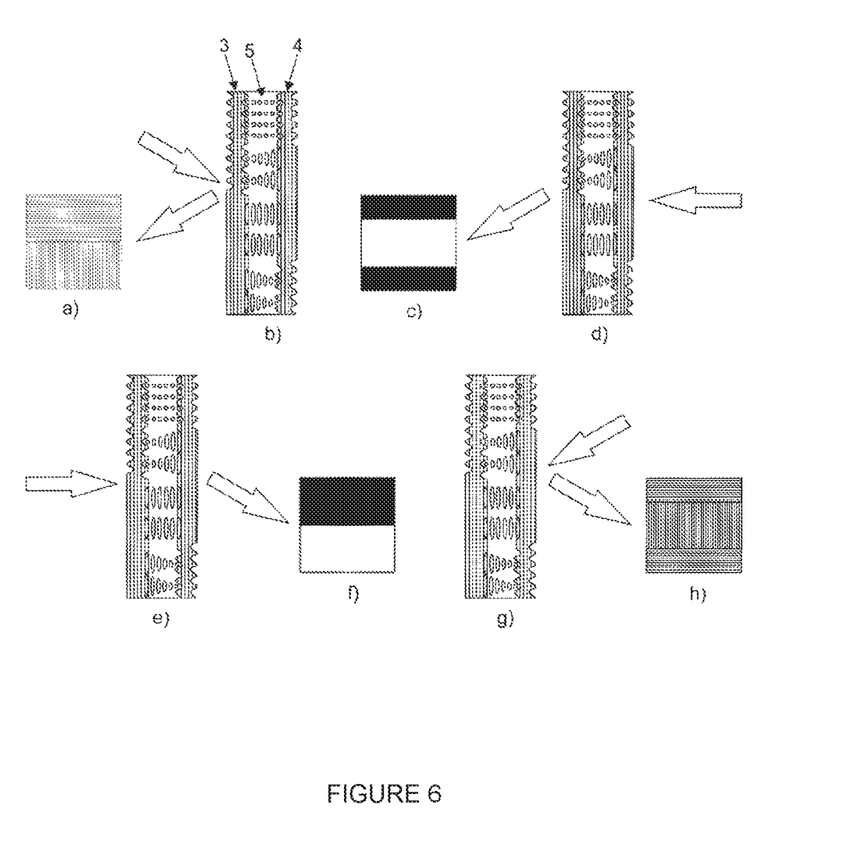
FIG. 6 shows an embodiment of the invention, where the liquid crystal sheet has been removed from the confinement substrates.
Figure 7:
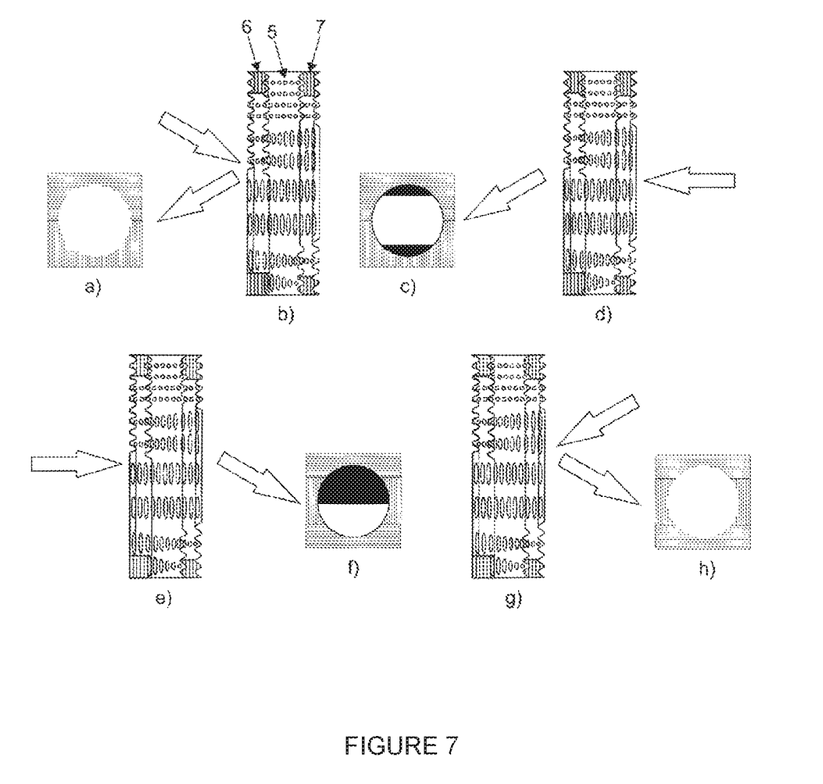
FIG. 7 shows an embodiment of the invention produced between two substrates, from which it is subsequently removed, where the holographic elements have been selectively metallized.
Figure 8:
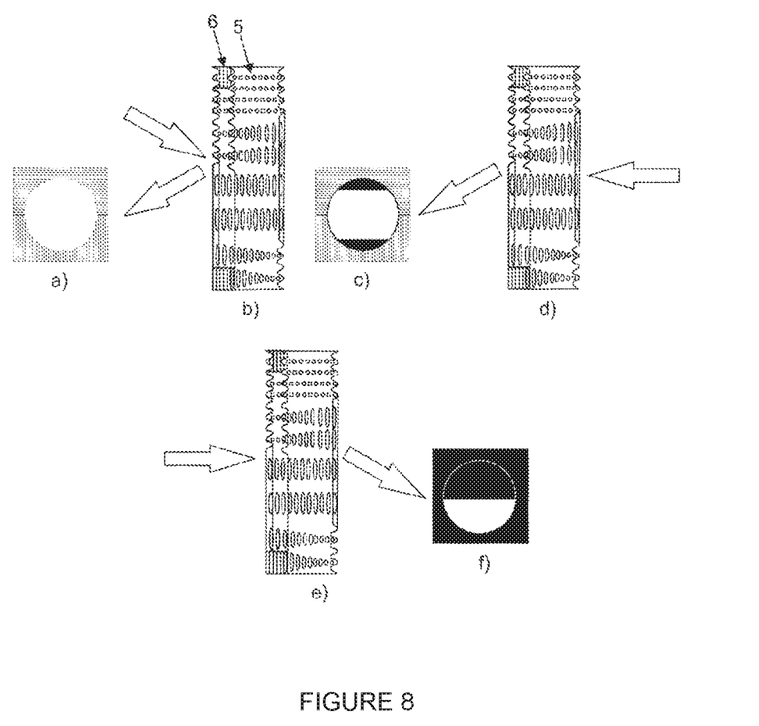
FIG. 8 shows an embodiment identical to that shown in FIG. 7, except for the particularity that only one surface has been metallized.

FIGS. 6 to 8 show examples in which the dye-doped LCP sheets are confined between holographic surfaces that are eliminated at a later stage, where the LCP sheet is removed and eventually metallized to configure the final device.

FIGS. 9 to 13 show examples in which the dye-doped LCP sheets are produced between two substrates. The LCP sheet is then removed and completely or partially metallized substrates with holographic surfaces are adhered thereto. The main difference in the operation of these devices and those described in FIGS. 1 to 8 is that, in the new series, the holographic reflective images and the latent transmissive images of the LCP sheet are independent of one another, where they can therefore be completely different.

Figures 1, 2:
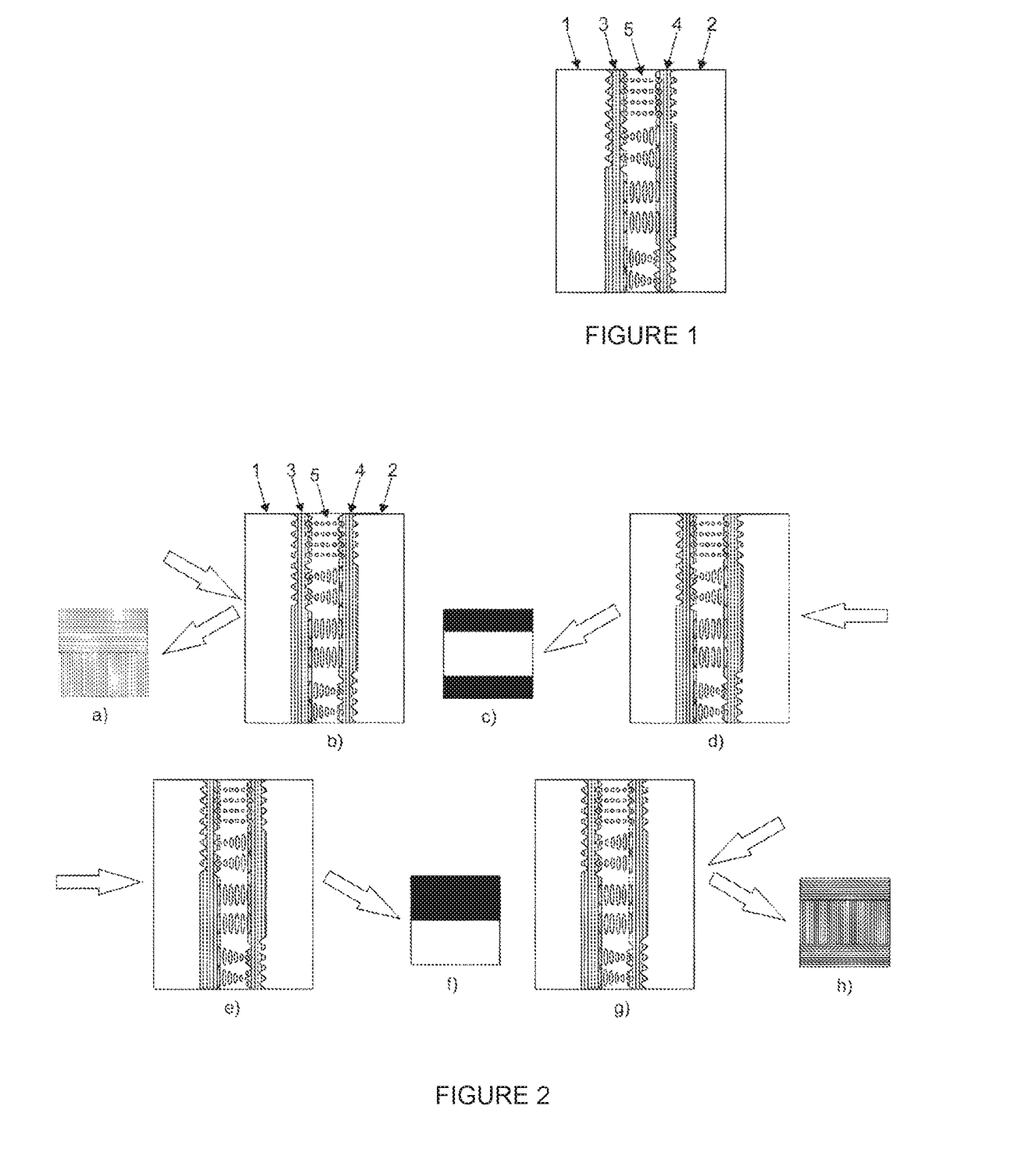
FIG. 1 shows a central vertical cross-section of a device according to one of the embodiments of the invention.
FIG. 2 shows the operating principle of the invention according to several steps corresponding to one of the possible embodiments.

FIG. 1 shows the central vertical cross-section of a device formed by a dichroic dye-doped LCP sheet located between two partially metallized holographic layers. The confinement substrates (1 and 2) may be rigid or flexible, made up of one or more layers of different materials, and have a holographic pattern on each inner surface. Partially metallized layers (3 and 4) are deposited on the inner surfaces of the substrates. These layers can have the same or a different color, reflectivity and surface coating. The dichroic dye-doped LCP material is placed between the metallized holographic substrates (5); the material will have twist configurations varying between −90° and 90°, depending on the holographic pattern existing on each surface. For the sake of simplicity, all the drawings that have been included show patterns with two unique perpendicular orientations on each surface; said patterns would only generate black and white images, without grayscale. If all the possible combinations of grayscales or multiple images are to be generated on each surface, all the possible orientations of the alignments (directions of the holographic patterns) on each surface must be considered.

The device production process starts with the deposition of the dichroic dye-doped LCP mixture on one of the substrates. The sandwich is produced using the other substrate and cured with UV light. The curing process causes polymerization of the liquid crystal, as well as polymerization of the dye, when applicable. Another alternative process for producing the same device would be the deposition of the LCP layer on each of the substrates, subsequently attaching them to one another. In any case, before the polymerization process, the material must reach the liquid crystal phase for it to adopt the desired alignment.

FIG. 2 shows the operating principle of the device. FIGS. 2*b*, 2*d*, 2*e* and 2*g* correspond to the same central vertical cross-section according to the structure of FIG. 1. FIG. 2*a* shows the holographic image that would be seen in reflection if the device is observed from the left side. FIG. 2*c* shows the image that would be seen in transmission if it is observed from the left side, illuminating with polarized light from the right side (with a specific polarization angle). If the incident polarization angle (or the device) is rotated 90°, the image shown will be a negative of the preceding one. FIG. 2*h* shows the holographic image that would be seen in reflection if it is observed from the right side. FIG. 2*f* shows the image that would be seen in transmission if it is observed from the right side, illuminating with polarized light from the left side.

Figure 3:
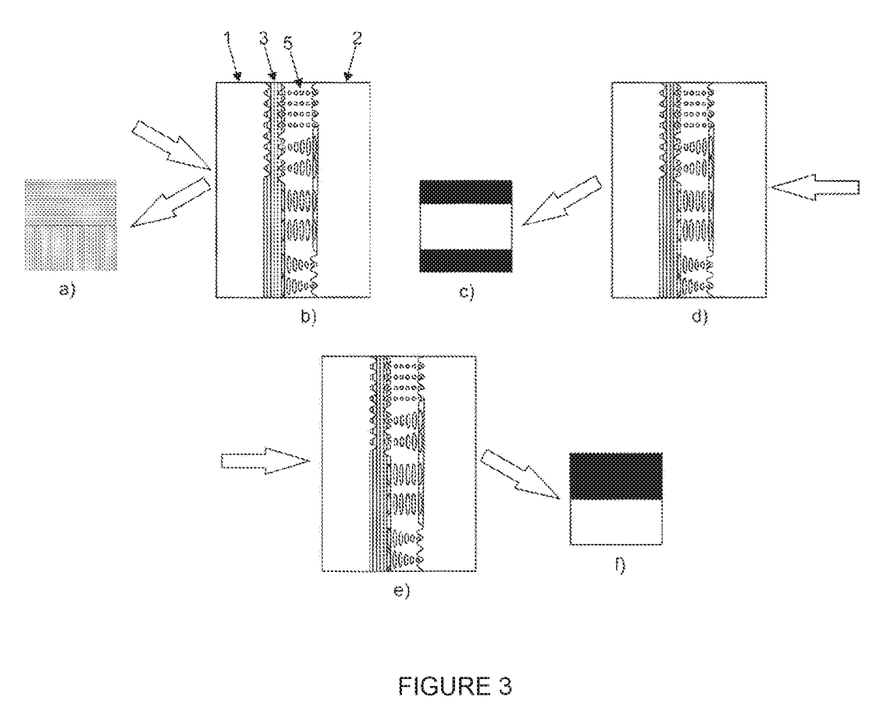
FIG. 3 shows an embodiment similar to the preceding ones, but with the particularity that only one of the holographic elements has been metallized.

FIG. 3 shows the operating principle of a device identical to those of FIGS. 1 and 2, except in this case only one of the holographic elements has been metallized. The other element is used exclusively for aligning the dichroic dye-doped LCP mixture.

Figure 4:
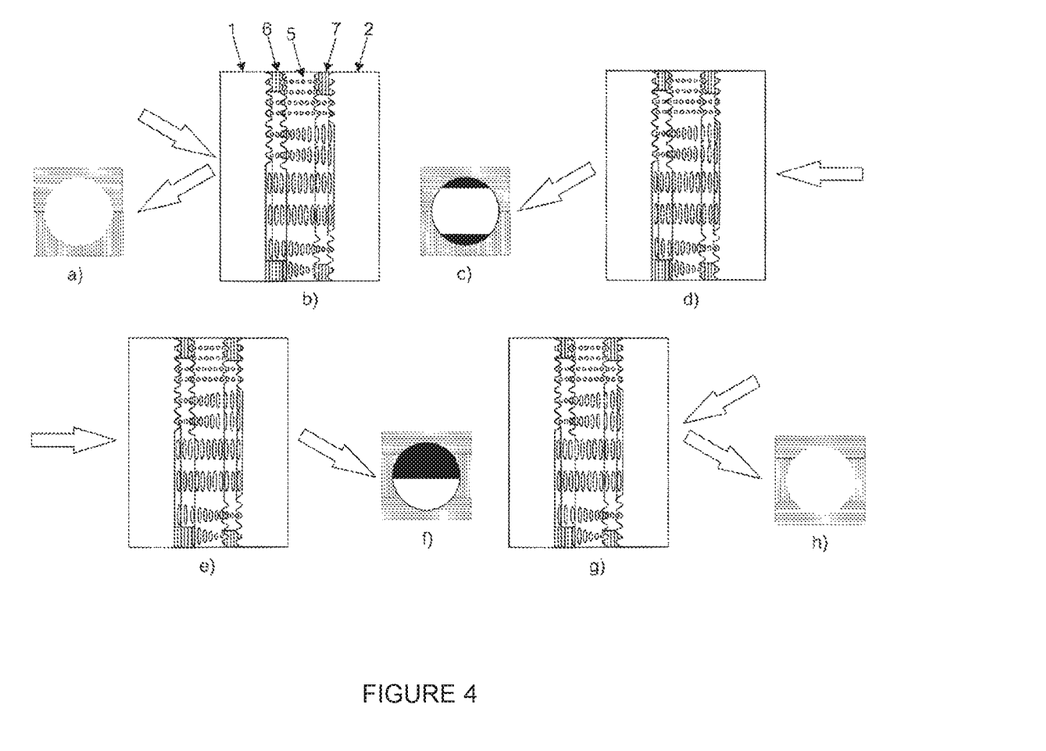
FIG. 4 shows an embodiment of the invention, where the holographic elements have been selectively metallized.

FIG. 4 shows the operating principle of a device whose holographic elements have been selectively metallized (6 and 7); in this example, the selected regions of the device present complete metallization. FIGS. 4*b*, 4*d*, 4*e* and 4*g* correspond to the same central vertical cross-section. FIGS. 4*a* and 4*h* show the image that would be seen in reflection if it is observed from the left and right side respectively. FIGS. 4*c* and 4*f* show the image that would be seen in transmission if it is observed from the left and right side respectively, illuminating with polarized light from the opposite side in each case.

Figure 5:
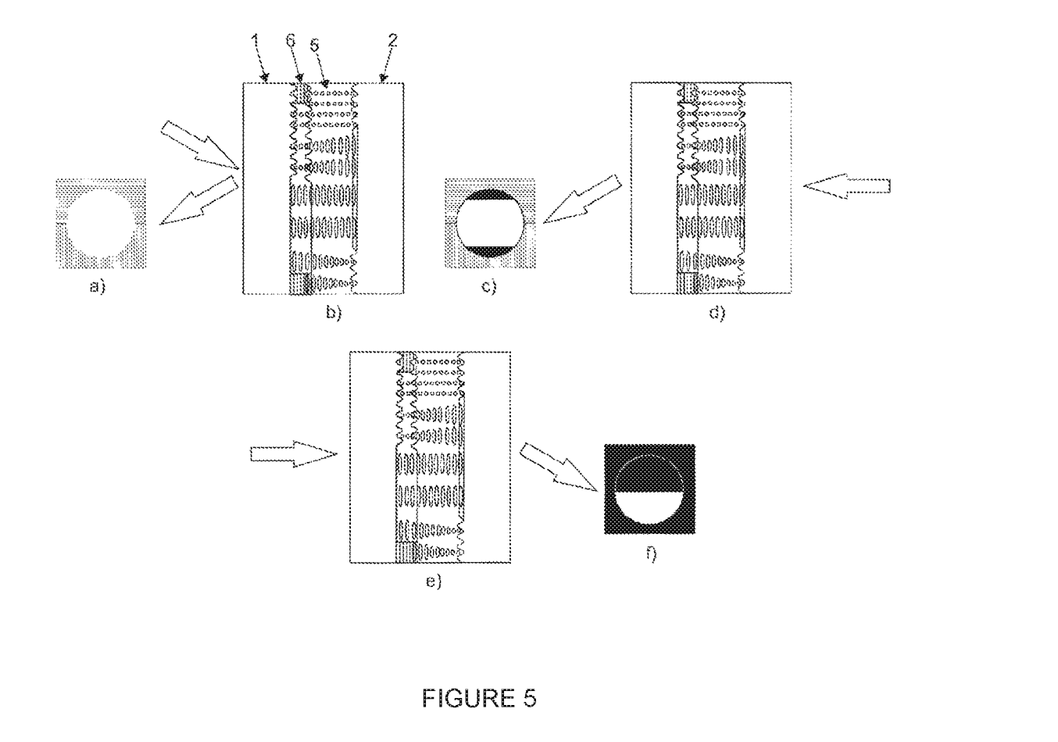
FIG. 5 shows an embodiment identical to that shown in FIG. 4, except in this case only one of the holographic elements has been metallized.

FIG. 5 shows the operating principle of a device identical to that of FIG. 4, except in this case only one of the holographic elements has been metallized. The other element is used exclusively for aligning the dichroic dye-doped LCP mixture.

FIG. 6 shows the operating principle of a device identical to those of FIGS. 1 and 2, except for the production process. These devices have a central structure (5) (LCP and dichroic dye) produced between two substrates, from which it is subsequently removed. The substrates can be rigid or flexible, for one or more uses. Partial metallization of the LCP structure can be performed before or after removing it from the substrates.

FIG. 7 shows the operating principle of a device identical to that of FIG. 4, except for the production process. These devices have a central structure (5) (LCP and dichroic dye) produced between two substrates, from which it is subsequently removed. The substrates can be rigid or flexible, for one or more uses. Partial metallization of the LCP structure can be performed before or after removing it from the substrates.

FIG. 8 shows the operating principle of a device similar to that of FIG. 7, except in this case only one surface has been metallized. It is also possible to create a structure such as the one shown in FIG. 6 with a single metallized surface.

FIGS. 9 to 13 show examples of devices whose production process is different. First, a polymerizable liquid crystal layer with various latent images on each face is produced. Confinement plates inducing an alignment pattern on the dichroic dye-doped polymerizable liquid crystal are used in this process. The resulting sheet shows two or more latent images when it is illuminated with polarized light on any of its sides, or when it is observed through a polarizer. The use of the polarizer is not actually required: the device works with partially polarized light, such as light originated from a grazing reflection of a dielectric surface (a shiny floor, table). Polarization component decompensation derived from the proximity of the Brewster angle is enough to show the effect. It can also be observed by placing the sheet in front of a liquid crystal display, for example, a computer display. The result is a thin and flexible sheet containing a set of images. The sheet appears colored, transparent and uniform when it is illuminated with natural light. However, when it is illuminated with completely or partially polarized light, a series of images emerges. The series is determined by the face of the device where the light impinges. If the sheet is slightly rotated, a second set of images appears. Different images also appear when the sheet is illuminated on the opposite side. The starting material is a mixture of polymerizable liquid crystal doped with at least one dichroic dye. Confinement plates are used. An alignment pattern with various orientations is induced on the inner face of each plate. The alignment directions are parallel to the plane of the confinement plates. The sheet containing the latent images is obtained in several steps that are summarized below: first, the dye-doped liquid crystal is introduced between the confinement plates. The plates orient the liquid crystal (and therefore the dye) according to the chosen pattern. Second, the liquid crystal is polymerized to permanently fix the orientation pattern. The polymerized liquid crystal sheet is removed from the confinement sandwich. The end result is a polymerized liquid crystal sheet containing alignment information, where the final transparent sheet will show one or more images when a polarized light source, a partially polarized light source, or a polarizer is used. If the alignment pattern of each confinement plate is different, a different set of images will appear depending on the face that is oriented towards the polarized light source or the polarizer.

The liquid crystal can be doped with one or more dyes. The orientation of the liquid crystal, and accordingly the dye, is determined by conditioning the inner surfaces of the confinement plates while producing the sheet.

Glass plates are normally used as substrates in the production of conventional liquid crystal displays; in this invention, those plates are replaced with confinement plates. The confinement plates can be produced in any opaque or transparent material, since they are used only during the production process and are subsequently removed.

Another advantageous characteristic of the present invention relates to variations in the liquid crystal orientation within the plane of the confinement plates. According to different embodiments of the invention, the orientations are achieved using several methods:

a) Using standard alignment techniques, such as those used in the production of liquid crystal displays, but restricting each orientation to specific areas of the plate, forming a pattern. A liquid crystal display usually seeks a uniform orientation over the entire surface. In these devices, however, different orientations are generated on the same surface. Once the liquid crystal has been polymerized, the outer confinement layers are then eliminated, obtaining a thin flexible sheet.

b) Using interdigitated electrodes oriented in different directions on the plane of the confinement plates. In this case, electric voltages are applied during the production process (although they are not required during ordinary use of the device). The electrodes are produced by photolithographic or micromechanical means, defining the required motif. A liquid crystal layer is subsequently deposited and voltage signals are applied to the electrodes to condition the orientation thereof. Therefore, an in-plane switching (IPS) effect is generated, forcing the liquid crystal to orient itself according to the predetermined pattern. A multiple alignment capable of reproducing the desired latent images is thereby obtained. Once it is aligned, the liquid crystal is polymerized in situ to create a permanent pattern oriented within the flexible sheet. Once it has been polymerized, the electric voltage becomes unnecessary, since the material maintains the orientation induced by the voltage distribution caused by the electrodes.

c) Using micrometric or submicrometric patterns as described above. Multiple images are obtained by applying several treatments to the confinement plates. The treatments are applied to different regions of each surface. The regions are isolated from one another using different techniques: masks, photolithography, isolation barriers, selective deposition, thermal evaporation, ink-jet, nano-patterning or any other standard microelectronic method.

Any of the described methods produces homogenous liquid crystal configurations. The liquid crystal molecules are always oriented parallel to the plane of the confinement plates, although their specific orientation within the plane varies in the different regions of the surface, such that some areas may become lighter or darker when they are illuminated with polarized light. Several independent images can be obtained on each side of the doped liquid crystal sheet. The variation of orientation in the alignment direction allows to define a grayscale or even color images. Liquid crystal polymerization allows the sheet, after being removed from the confinement plates, to be used independently in many applications: the latent images are already defined.

Figure 9:
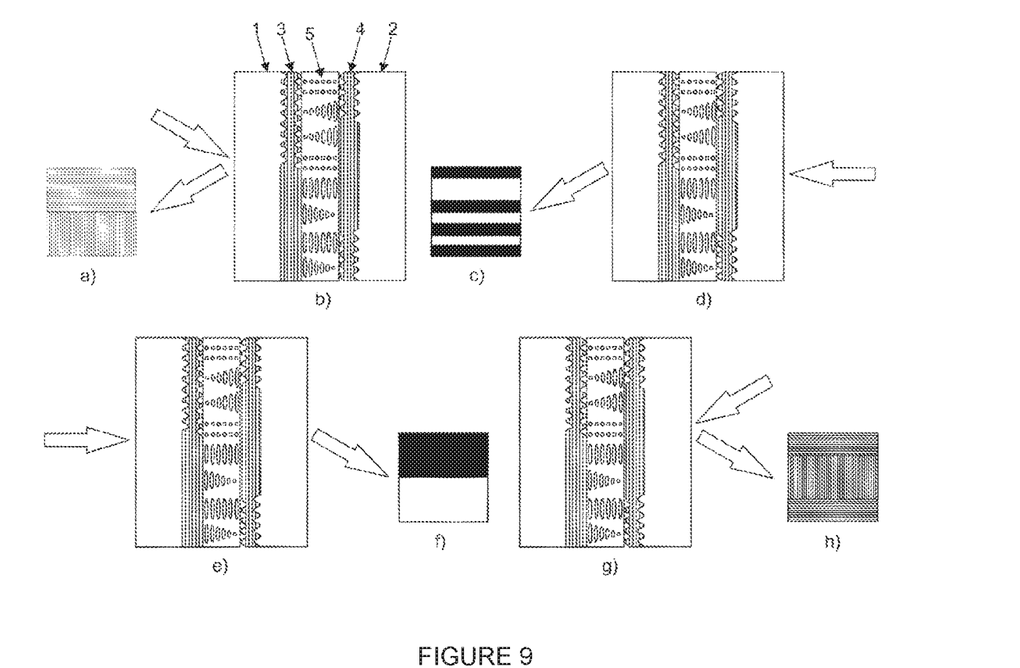
FIG. 9 shows an embodiment of the invention in which the reflective images of the sheets adhered to the LCP layer are different from the images generated in transmission.

FIG. 9 shows a device whose operating principle is identical to that of the devices of FIGS. 1 and 2. In this case, the reflective images that are obtained on the sheets adhered to the dichroic dye-doped LCP layer are different from the images generated by transmission on the LCP sheet itself. This does not depend on the method used for creating the flexible sheet.

Figure 10:
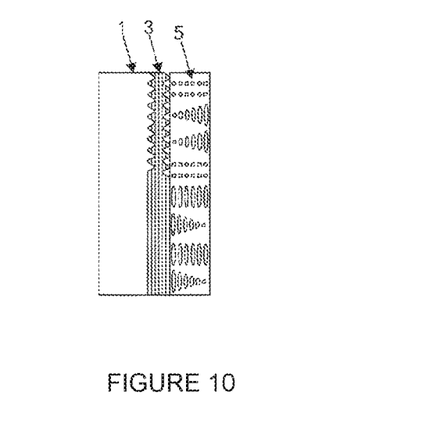
FIG. 10 shows an embodiment similar to that shown in FIG. 9, except in this case a single holographic element has been adhered to one of the surfaces.

FIG. 10 shows the operating principle of a device similar to that of FIG. 9, except in this case a single holographic element has been adhered to one of the surfaces.

Figure 11:
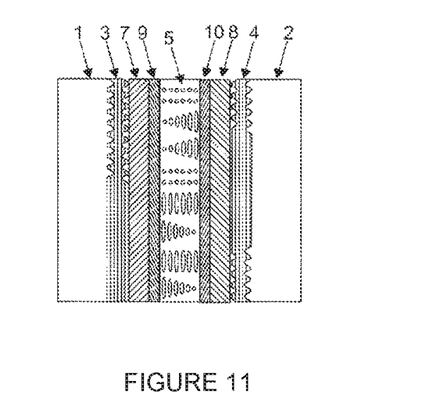
FIG. 11 shows an embodiment of the invention where the LCP sheet is not removed from the confinement substrates but are left there, forming part of the final structure of the device.

FIG. 11 shows a device whose operating principle is identical to that of FIG. 9, in which the LCP is confined between two substrates (7 and 8) covered with alignment layers (9 and 10). In this case, the LCP is not removed from between the confinement substrates but are left there, forming part of the final structure of the device.

Figure 12:
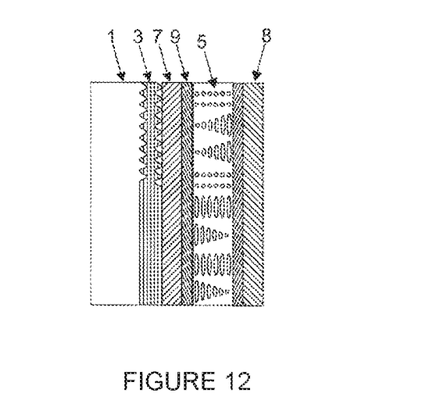
FIG. 12 shows an embodiment similar to that shown in FIG. 11, except in this case a single holographic element has been adhered to one of the surfaces.

FIG. 12 shows the operating principle of a device similar to that of FIG. 11, except in this case a single holographic element has been adhered to one of the surfaces.

Figure 13:
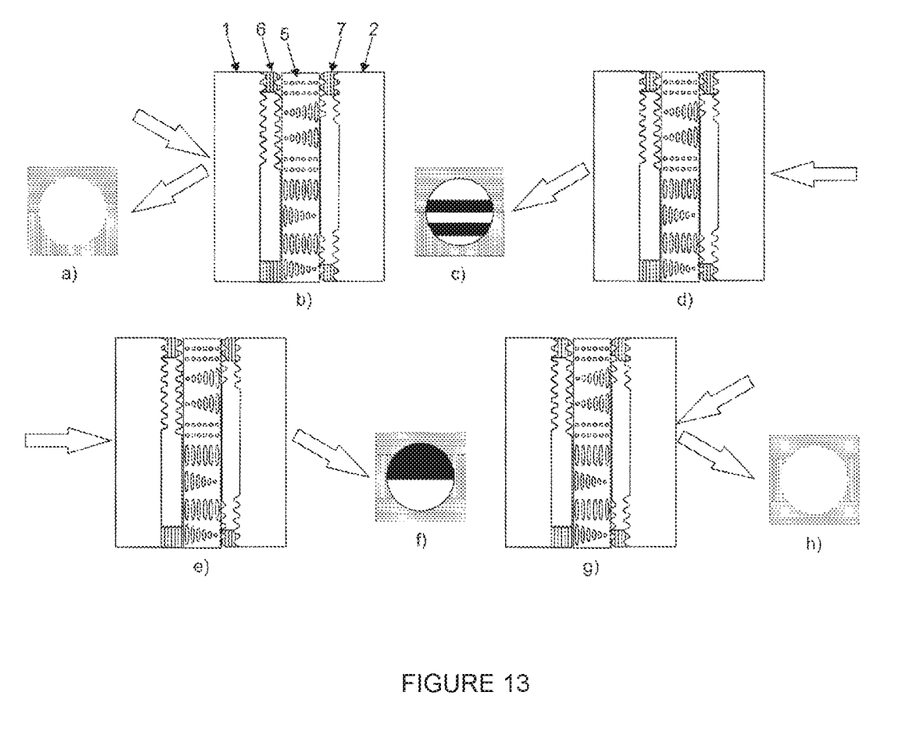
FIG. 13 shows an embodiment of the invention where the reflective images obtained in the sheets adhered to the LCP sheet are different from the images generated in transmission on the LCP sheet itself.

FIG. 13 shows a device whose operating principle is identical to that of FIG. 4. In this case, the reflective images that are obtained on the sheets adhered to the dichroic dye-doped LCP layer are different from the images generated by transmission on the LCP sheet itself. This does not depend on the method used for creating the flexible sheet.

The present invention is directly applicable as a feature for document security against banknote counterfeiting, or in the authentication of documents, credit cards, checks, packages or any element whose intrinsic value makes its verification thereof advisable. The verification is performed in transmissive mode, observing with polarized light the pattern of dark and light regions that is formed, which depends exclusively on the orientation of the liquid crystal and the dichroic dye on the entrance surface. If the dichroic dye is aligned parallel to the polarization, light will be absorbed, obtaining a dark state. If the dye is located perpendicular to the polarization, light will not be absorbed, obtaining a clear state. If the faces of entry and exit are switched, the dark and light regions produced will depend on the orientation of the dye on the other side. Therefore, any image can be induced by forcing the alignment of the corresponding regions on one of the sides. The other side may contain a different image, independent of the preceding one. The effect is observed by keeping the polarization fixed and flipping over the device, placing the opposite side of the film in front of the polarized light. Alternatively, the effect can be observed by keeping the cell fixed and placing a polarizer in front of or behind the sheet.

The use of a polarized light source or a polarizer is not strictly necessary in order to see the effect. The effect is also seen when the sample is illuminated with partially polarized light, for example, the grazing reflection from a dielectric surface such as a polished floor or a table. This favors the massive implementation of the invention as a security element in labels or banknotes, for example.

The images are observed in reflection with natural light and without requiring any additional tool.

The invention claimed is:

1. A transparent device for document security applications, the device presenting various latent images on each side when in transmission and in reflection mode, characterized in that it comprises:

two confinement substrates forming a sandwich-like structure;

at least one partially metallized or non-metallized holographic element, the partially metallized holographic element comprising one or more layers of partially metallized material, deposited on at least one of the surfaces of at least one of the confinement substrates, such that a fraction of the incident light is reflected, allowing the remaining fraction of the light to be transmitted, forming reflective holographic images when illuminated;

a dichroic dye doped liquid crystal sheet covering the at least one holographic element, the doped liquid crystal sheet oriented according to alignment directions induced in different predefined regions of at least one of the confinement substrates, and wherein the orientation of the different regions of each side of the liquid crystal sheet is established according to at least one alignment pattern, wherein the alignment pattern is obtained through the grooves of the at least one partially metallized or non-metallized holographic element, the orientations differing from one another in a certain angle forming latent images which are different on each side of the sheet and individually visible when illuminated with polarized light, wherein a first alignment pattern induced on one of the faces of the substrate is independent of a second alignment pattern induced on a second of the faces of the substrate and is obtained by at least one technique selected from the group consisting of mechanical rubbing of the alignment layer, photoalignment of a photosensitive material, oblique deposition of an aligner material, alignment via a micrometric or a submicrometric pattern, generation of a pattern of interdigitated electrodes on a surface of the confinement substrate oriented in different directions and combinations thereof.

2. The device according to claim 1, wherein the alignment pattern of at least one face of the dichroic dye doped liquid crystal sheet is obtained through the grooves of the holographic element deposited on one of the surfaces of one of the confinement substrates, thereby that the holographic element acts as a hologram and as an alignment surface.

3. The device according to claim 2, wherein the alignment directions on each face are independent and have relative orientations comprised from 0° to 90° to generate one image in analogic grayscale, or relative orientations of 0° and 90° to generate one monochrome image, or relative orientations at 0°, 45°, 90° and 135° to generate two non-overlapping monochrome images on each side of the sheet which are individually visible in transmission and without interference from one another.

4. The device according to claim 1, further comprising a protective sheet on both sides of the assembly formed by the liquid crystal sheet and the holographic element to preserve the device.

5. The device according to claim 4, wherein the alignment directions on each face are independent and have relative orientations comprised from 0° to 90° to generate one image in analogic grayscale, or relative orientations of 0° and 90° to generate one monochrome image, or relative orientations at 0°, 45°, 90° and 135° to generate two non-overlapping monochrome images on each side of the sheet which are individually visible in transmission and without interference from one another.

6. The device according to claim 1, wherein the alignment directions on each face are independent and have relative orientations comprised from 0° to 90° to generate one image in analogic grayscale, or relative orientations of 0° and 90° to generate one monochrome image, or relative orientations at 0°, 45°, 90° and 135° to generate two non-overlapping monochrome images on each side of the sheet which are individually visible in transmission and without interference from one another.

7. A transparent device for document security applications, the device presenting various latent images on each side when in transmission and in reflection mode, characterized in that it comprises:

two confinement substrates forming a sandwich-type structure;

at least one partially metallized or non-metallized holographic element, the partially metallized holographic element comprising one or more layers of partially metallized material, deposited on at least one of the surfaces of at least one of the confinement substrates such that a fraction of the incident light is reflected, allowing the remaining fraction of the light to be transmitted, forming reflective holographic images when illuminated;

a dichroic dye doped liquid crystal sheet covering the at least one holographic element, the doped liquid crystal sheet oriented according to alignment directions induced in different predefined regions of at least one of the confinement substrates, and wherein the orientation of the different regions of each side of the liquid crystal sheet is established according to at least one alignment pattern, the orientations differing from one another in a certain angle forming latent images which are different on each side of the sheet and individually visible when illuminated with polarized light, wherein the alignment pattern of at least one face of the dichroic dye doped liquid crystal sheet is obtained through the grooves of the at least one partially metallized or non-metallized holographic element deposited on one of the surfaces of the confinement substrates, thereby that the holographic element acts as a hologram and as an alignment surface.

8. The device according to claim 7, further comprising a protective sheet on both sides of the assembly formed by the liquid crystal sheet and the holographic element to preserve the device.

9. The device according to claim 8, wherein the alignment directions on each face are independent and have relative orientations comprised from 0° to 90° to generate one image in analogic grayscale, or relative orientations of 0° and 90° to generate one monochrome image, or relative orientations at 0°, 45°, 90° and 135° to generate two non-overlapping monochrome images on each side of the sheet which are individually visible in transmission and without interference from one another.

10. The device according to claim 7, wherein the alignment directions on each face are independent and have relative orientations comprised from 0° to 90° to generate one image in analogic grayscale, or relative orientations of 0° and 90° to generate one monochrome image, or relative orientations at 0°, 45°, 90° and 135° to generate two non-overlapping monochrome images on each side of the sheet which are individually visible in transmission and without interference from one another.

* * * * *